(12) United States Patent
Ackley

(10) Patent No.: US 8,016,533 B2
(45) Date of Patent: Sep. 13, 2011

(54) LOCK NUT WITH LOW ON/HIGH OFF TORQUE CONTROL

(75) Inventor: Randy Ackley, Fenton, MI (US)

(73) Assignee: Acument Intellectual Properties LLC, Troy, MI (US)

( * ) Notice: Subject to any disclaimer, the term of this patent is extended or adjusted under 35 U.S.C. 154(b) by 820 days.

(21) Appl. No.: 11/156,939

(22) Filed: Jun. 20, 2005

(65) Prior Publication Data

US 2005/0286989 A1 Dec. 29, 2005

Related U.S. Application Data

(60) Provisional application No. 60/582,749, filed on Jun. 24, 2004.

(51) Int. Cl.
*F16B 39/28* (2006.01)

(52) U.S. Cl. ......... 411/283; 411/281; 411/284; 411/937

(58) Field of Classification Search .................. 411/284, 411/281, 283, 937
See application file for complete search history.

(56) References Cited

U.S. PATENT DOCUMENTS

| | | | | |
|---|---|---|---|---|
| 675,740 A | * | 6/1901 | Keen | 411/284 |
| 1,903,921 A | * | 4/1933 | Rupf | 411/277 |
| 2,439,253 A | | 4/1948 | Kendrick | |
| 2,564,550 A | | 8/1951 | Tichenor | |
| 2,677,407 A | | 5/1954 | McKenzie | |
| 2,727,551 A | * | 12/1955 | Rees | 411/303 |
| 3,142,325 A | | 7/1964 | Swanstrom | |
| 3,208,494 A | * | 9/1965 | Skidmore | 411/283 |
| 3,301,298 A | | 1/1967 | Stover, III | |
| 3,412,772 A | | 11/1968 | Meyfarth et al. | |
| 3,433,280 A | | 3/1969 | Reusser | |
| 3,455,361 A | * | 7/1969 | Stoll et. al. | 411/284 |
| 3,456,704 A | * | 7/1969 | Johnson | 411/284 |
| 3,457,979 A | * | 7/1969 | Munro | 411/284 |
| 3,507,313 A | * | 4/1970 | Stockslager | 411/284 |
| 3,543,826 A | * | 12/1970 | Forgaard | 411/284 |
| 3,678,978 A | * | 7/1972 | Davis et al. | 411/282 |
| 3,679,879 A | * | 7/1972 | Seki et al. | 708/102 |
| 3,683,989 A | * | 8/1972 | Follstaedt et al. | 411/277 |
| 4,207,938 A | * | 6/1980 | Mortus | 411/281 |
| 4,790,703 A | | 12/1988 | Wing | |
| 5,460,467 A | | 10/1995 | Dessouroux | |
| D367,003 S | * | 2/1996 | Grey | D8/397 |
| 5,499,893 A | * | 3/1996 | Thurston et al. | 411/282 |
| 5,603,661 A | * | 2/1997 | Grey | 470/3 |
| 6,132,153 A | | 10/2000 | LeVey et al. | |
| 6,364,588 B1 | | 4/2002 | Fujii et al. | |
| 6,386,808 B2 | | 5/2002 | Fujii et al. | |

* cited by examiner

*Primary Examiner* — Victor Batson
*Assistant Examiner* — Roberta S Delisle
(74) *Attorney, Agent, or Firm* — Clark Hill PLC

(57) ABSTRACT

A lock nut having a plurality of sides having a radius crimp which is consistent with the radius of the threaded bore in the lock nut. Preferably, the lock nut is crimped using a three sided die, each die having a radius crimp with relief angles. The relief angles are provided at a desired angle to result in the desired amount of contact area between the lock nut and the die. The device includes a housing, and the housing includes at one end a threaded bore which is configured to mount on a ram. An opposite end of the housing provides a tapered die section in which the three sided die is disposed. The three sided die is engaged with a locking die base which is movable within the housing.

13 Claims, 4 Drawing Sheets

LOCK NUT WITH LOW ON/HIGH OFF TORQUE CONTROL

This application claims the benefit of U.S. Provisional Application Ser. No. 60/582,749, filed Jun. 24, 2004, which is hereby incorporated herein by reference in its entirety.

BACKGROUND

This invention generally relates to lock nuts designed to have low on/high off characteristics, as well as relates to devices and methods for providing that a lock nut has low on/high off torque characteristics. More specifically, the present invention relates to a crimped lock nut, and a device and method for crimping a lock nut, such that the crimped lock nut has low on/high off torque characteristics.

In many applications, such as in automobile applications, it is desirable to provide that a lock nut has low on/high off torque characteristics (i.e., the lock nut is easy to thread on, but resists threading off or is difficult to remove).

In the past, one way in which lock nuts have been provided with high torque off characteristics is through a Stover crimp. In a Stover crimping process, flats are applied to either two or three sides of a lock nut, and the flats are pushed toward the axial center of the lock nut. The pushing causes the geometry of the threaded bore in the lock nut to distort. While the distortion provides that the lock nut has higher torque off characteristics, the distortion provides that the contact and torque between the lock nut and the structure on which the lock nut is to be threaded (hereinafter assumed to be a threaded bolt) is not optimum—i.e., due to narrow contact points. The distortion may result in the lock nut having such high torque requirements that the threaded bolt is subject to breaking (i.e., due to galling between the lock nut and threaded bolt) as the lock nut is installed or removed. Crimping using flats may also cause burrs to form on the lock nut.

Another way in which lock nuts have been provided with high torque off characteristics is by providing a nylon insert in the lock nut. While lock nuts with nylon inserts typically have slightly better on-torque to off-torque ratios than do lock nuts without nylon inserts, the fact that the inserts are nylon provides that such lock nuts are not practical for use in hot applications—i.e., in applications where the nylon insert will be subject to a significant amount of heat, as the nylon inserts are subject to melting in such an environment.

In order to hold the nylon insert, a lock nut must be formed with a barrel at one end. As such, lock nuts which are designed for use with nylon inserts are typically more difficult to manufacture (i.e., require more assembly, more man hours, and more floor space to manufacture) than are lock nuts which are not designed for use with nylon inserts. Furthermore, nylon inserts are subject to popping out during assembly.

Still another way in which lock nuts have been provided with high torque off characteristics is through a cone crimp. In a cone crimping process, a cone is applied to the top of the lock nut in order to collapse the threads at the top of the nut. While this generally increases the torque required to install or remove the nut, it also causes distortion of the thread pitch. The distortion may result in the lock nut having such high torque requirements that the threaded bolt is subject to breaking (i.e., due to galling between the lock nut and threaded bolt) as the lock nut is installed or removed. Typically, with regard to a cone crimp, the on-torque to off-torque range is not as forgiving. In other words, the on torque must be great to provide a significant off torque. As such, any slight variation may cause galling, low off torque, or broken bolts.

OBJECTS AND SUMMARY

An object of an embodiment of the present invention is provide a crimped lock nut having low on/high off torque characteristics.

Another object of an embodiment of the present invention is provide a crimped lock nut which includes a threaded bore which does not have a substantially distorted geometry or thread pitch.

Another object of an embodiment of the present invention is provide a lock nut which has high torque off characteristics and which can be used in hot applications.

Another object of an embodiment of the present invention is provide a lock nut which has high torque off characteristics and is easy to install, without substantial risk of bolt breakage due to galling.

Another object of an embodiment of the present invention is provide a method and device for crimping a lock nut wherein the resulting lock nut meets one or more of the foregoing objects.

Another object of an embodiment of the present invention is provide a method and device for crimping a lock nut wherein there are relatively broad contact points between the faces used to do the crimping and the sides of the lock nut.

Briefly, and in accordance with at least one of the foregoing objects, an embodiment of the present invention provides a lock nut having a plurality of sides having a crimp which has a radius that is consistent with the radius of the threaded bore in the lock nut (as well as consistent with the radius of the threaded bolt—i.e., the structure on which the lock nut is to be engaged).

Other embodiments of the present invention include methods and devices for crimping a lock nut. Specifically, preferably the lock nut is crimped using a three sided die, each die having a radius crimp with relief angles. Preferably, the radius of the crimp face is consistent with the radius of the threaded bore in the lock nut, and the angle of the relief angles are selected to provide to provide a desired amount of contact area between the crimp face and the lock nut.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DESCRIPTION

Figure 1:
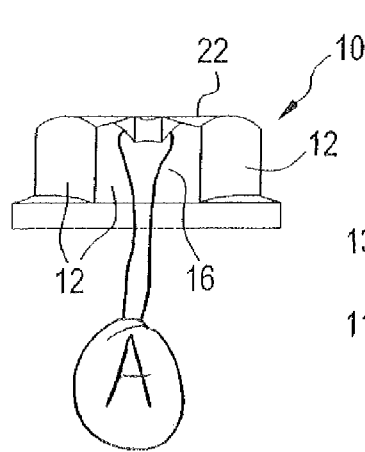
FIG. 1 is a side view of a crimped lock nut, where the lock nut is in accordance with an embodiment of the present invention.

While the present invention may be susceptible to embodiment in different forms, there are shown in the drawings, and herein will be described in detail, embodiments thereof with the understanding that the present description is to be considered an exemplification of the principles of the invention and is not intended to limit the invention to that as illustrated and described herein.

Figure 2:
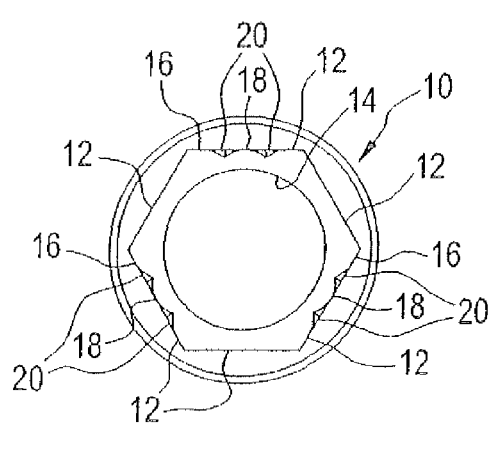
FIG. 2 is a top view of the lock nut shown in FIG. 1.

FIGS. 1 and 2 illustrate one embodiment of the present invention, specifically a crimped lock nut 10. The lock nut 10 is conventional in that it has six vertical sides 12 extending from a bottom wall of the lock nut 10 to a top wall of the lock nut 10. The lock nut also includes a central, threaded bore 14 which extends from the bottom wall to the top wall for threading onto, for example, a threaded bolt. However, a plurality of the sides 12, specifically preferably three of the sides 16 (i.e., every other side), are crimped in accordance with the present invention. More specifically, each of the crimped sides 16 preferably has a crimp radius 18 that is concave, such that the crimp radius 18 curves outwardly, away from the threaded bore 14. More specifically, the crimp radius 18 is preferably consistent with the radius of the threaded bore 14 in the lock nut 10. The nature of the crimping may provide that a crimp mark 20 is provided on each side of the crimp radius 18. The crimp marks 20 taper inwardly toward the threaded bore 14 from the sides 16 to the top wall. Preferably, only a portion, specifically the top portion 22, of the sides 16 of the lock nut 10 are crimped, as this prevents cross threading.

The fact that the lock nut 10 shown in FIGS. 1 and 2 is crimped provides that the lock nut 10 has high off torque characteristics. Additionally, the fact that the crimp radius 18 is consistent with the radius of the threaded bore 14 provides that the threaded bore 14 does not have a substantially distorted geometry or thread pitch. As such, the lock nut 10 has low on torque characteristics and hence is easy to install, without substantial risk of bolt breakage due to galling. The fact that the lock nut 10 does not include any nylon inserts provides that the lock nut 10 is practical for use in hot applications.

Figure 3:
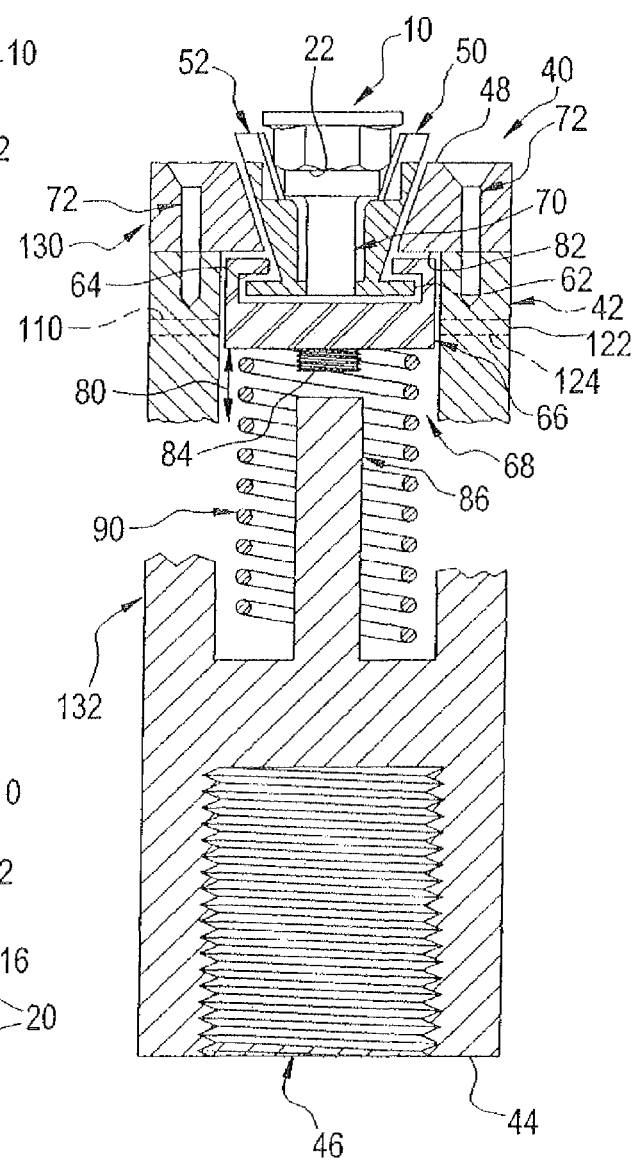
FIG. 3 is a partial cross-sectional view of a lock nut crimping device which is in accordance with an embodiment of the present invention, showing the device in an open position for receiving a lock nut.
Figure 4:
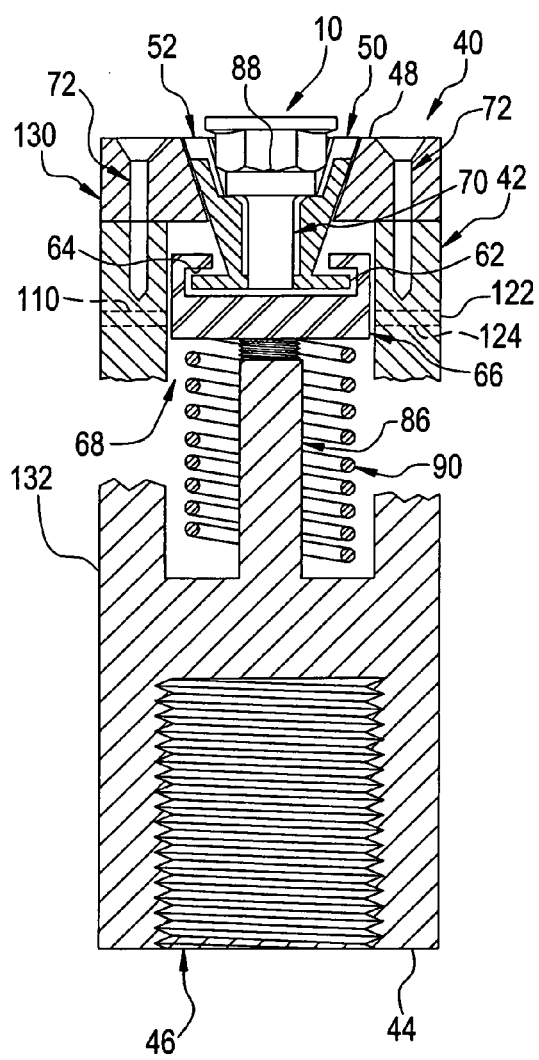
FIG. 4 is similar to FIG. 3, but shows the device in a closed position, crimping a lock nut.
Figure 5:
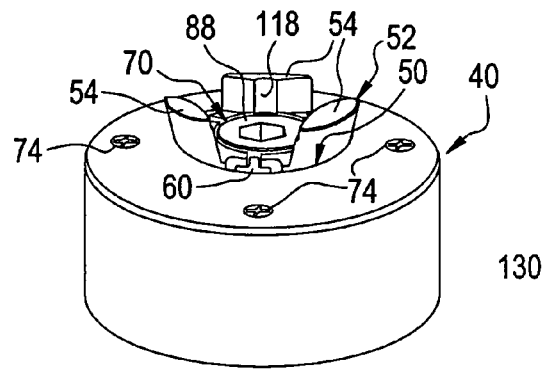
FIG. 5 provides a top, perspective of the device shown in FIG. 3.
Figure 6:
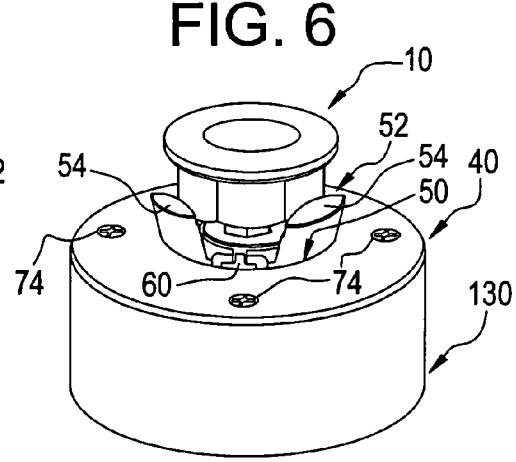
FIG. 6 is similar to FIG. 5, but shows a lock nut positioned in the device.

FIGS. 3 and 4 illustrate a device 40 which can be used to crimp a lock nut 10, such as to provide that which shown in FIGS. 1 and 2, for example. The device 40 includes a housing 42, and the housing 42 preferably includes at one end 44 a threaded bore 46 which is configured to mount on a ram. An opposite end 48 of the housing 42 provides a tapered die section 50 in which a three sided die 52 is disposed. Each of the three sides 54 of the crimp die 52 is configured to crimp a corresponding face or side 16 of a lock nut 10. Each side 54 of the crimp die 52 includes a crimp radius 118 that is concave, and more specifically, is preferably consistent with the radius of a threaded bore 14 in a lock nut 10 which is to be crimped (and with the threaded structure on which the lock nut is to be threaded). Each crimp radius 118 is preferably disposed between relief angles 56 which are provided at a desired angle to result in the desired amount of contact area resulting between the lock nut 10 and the die 52 during the crimp, thereby providing the resulting, desired torque control. Preferably, the crimp radii 118 are configured to crimp only a portion of the length of the threads in the threaded bore, thereby preventing cross threading. More specifically, preferably the device 40 is designed to crimp only the top portion 22 of the nut 10, thereby providing that the device 40 is designed such that variation in nut height does not affect the depth of the torque control feature (i.e., the crimp).

Figure 8:
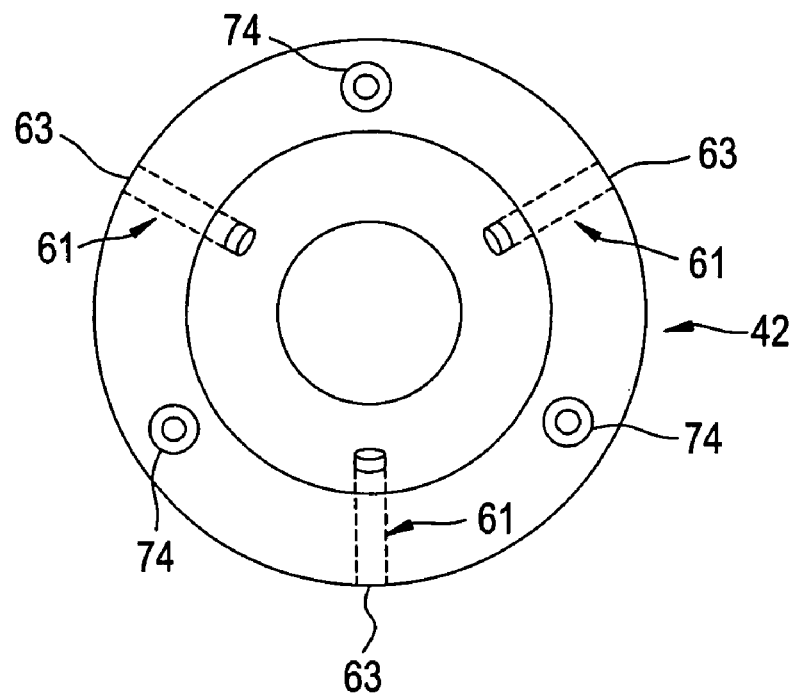
FIG. 8 provides a top view of a top housing component of the device shown in FIGS. 3 and 7, showing the top housing component isolated from the remainder of the device.

Preferably, the three sided crimp die 52 is generally conical (such as a 10 degree angle) and is configured to open and close at its top. To this end, preferably silicone, rubber, or some other appropriate, pliable material 60 is molded between the die sections 54. A lip 62 is disposed opposite the top end of the die 52, and the lip 62 is received in an undercut 64 of a die base 66. The die base 66 is disposed in a chamber 68 in the housing 42, and is threadably engaged with a threaded stud 70. Preferably, as shown in FIG. 8, three bores 61 (i.e., 120 degrees apart) extend through the housing 42, and corresponding alignment pins 63 are disposed in the bores 61. The alignment pins 63 tend to press the three die pieces 54 together. Preferably, external surfaces of the die pieces 54 are profiled to be contacted by the alignment pins 63.

As discussed above, the die base 66 is disposed in a chamber 68 in the housing 42. More specifically, the die base 66 is movable therein, generally in an up and down direction as indicated by double arrow 80 in FIG. 3. Preferably, movement of the locking die base 66 is limited in the up direction viz-a-viz contact between the die base 66 and an internal shoulder 82 of the housing 42. Preferably, movement of the locking die base 66 is limited in the down direction viz-a-viz contact between the end 84 of the threaded stud 70 and a positive stop 86 which is disposed in the chamber 68. The extent of movement of the die base 66 is preferably settable viz-a-viz adjustment of the threaded stud 70. To this end, preferably an end 88 of the threaded stud 70 has a profile which facilitates engagement of a driver, such as an Allen or Torx® brand driver, with the end 88 of the threaded stud 70. Adjusting the threaded stud 70 results in adjustment of the crimp depth and torque. A spring 90 is provided in the housing 42 and engages the die base 66 such that the three sided die 52 is generally biased out of the top of the housing 42, i.e., out of the tapered die section 50. Due to the die base 66 contacting the internal shoulder 82 of the housing 42, the three sided die 52 does not eject from the housing 42 as a result of the spring force.

Figure 9:
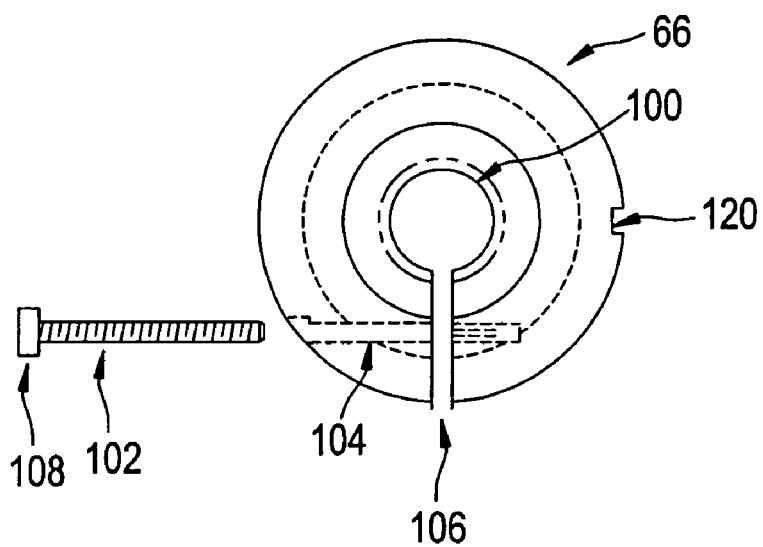
FIG. 9 provides a top view of a locking die base component of the device shown in FIGS. 3 and 7, showing the locking die base component isolated from the remainder of the device.
Figure 10:
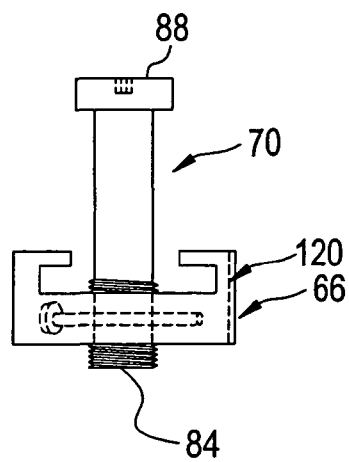
FIG. 10 provides a side view of a threaded stud and die base components, shown isolated from the remainder of the device.
Figure 11:
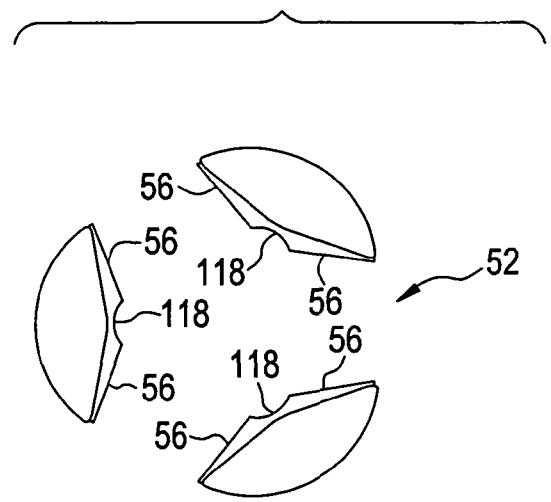
FIG. 11 provides a top view, showing the three jaws open.
Figure 12:
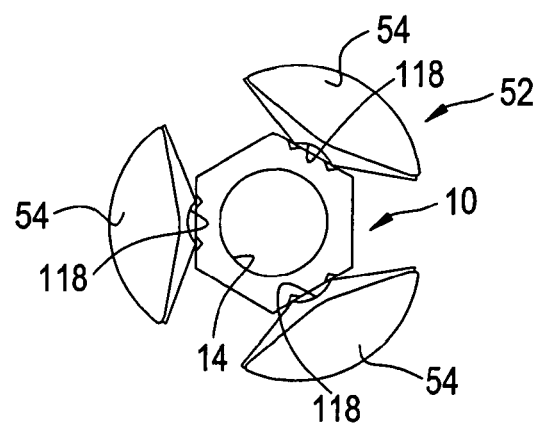
FIG. 12 is similar to FIG. 11, showing the jaws crimping a lock nut.

As shown in FIG. 9, preferably the die base 66 consists of a split collar. As described above, the die base 66 is threadably engaged with the adjustment stud 70. As such, the die base 66 includes a threaded bore 100 at its axial center, and the threaded bore 100 is threadably engageable with the threaded stud 70. The die base 66 can be locked about the threaded stud 70 viz-a-viz a threaded bolt 102 which is received in a threaded bore 104 which extends across a gap 106 in the split collar. The head 108 of the threaded bolt 102 is accessible from outside the housing via a bore 110 in the side of the housing 42. Tightening the threaded bolt 102 causes the gap 106 to narrow and the die base 66 to tighten its grip on the adjustment stud 70. Preferably, the head 108 of the threaded bolt 102 has a profile which facilitates engagement with a drive tool. Assuming the threaded bolt 102 is sufficiently loose, the threaded stud 70 is adjustable relative to the die base 66. However, tightening the threaded bolt 102 causes the die base 66 to lock about the threaded stud 70 such that the threaded stud 70 is no longer adjustable.

The die base 66 is not generally rotatable in the chamber 68. Specifically, preferably the die base 66 includes a keyway 120 which receives a guide pin 122. The guide pin 122 extends through a bore 124 in the side of the housing 42 and prevents the die base 66 from rotating in the housing 42.

The housing 42 is preferably formed of two pieces, a top piece 130 and a bottom piece 132, which are bolted or otherwise secured together. As shown in FIGS. 3-7, the housing 42 can be provided such that three threaded bolts 74 (i.e., 120 degrees apart) extend into corresponding bores 72 in the top and bottom housing pieces 130, 132 and secure the two pieces together. FIG. 8 provides a top view of the top housing component 130 in isolation from the remainder of the device.

To assemble the device 40, the three sided die 52 is loaded into the tapered die section 50 and is pressed down to compress and assemble the three sided die 52 into the die base 66. Then, the threaded stud 70 is threaded into the die base 66, the spring 90 is loaded, and the top piece 130 of the housing 42 is secured to the bottom piece 132 of the housing 42.

Figure 7:
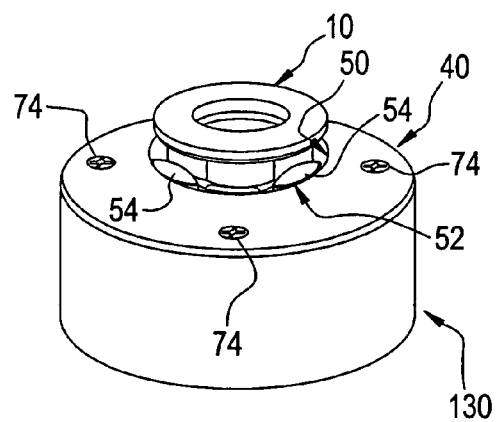
FIG. 7 is similar to FIG. 6, but shows the lock nut being pushed down and the device crimping the lock nut.

To use the device 40, a lock nut 10 is placed in the three sided die 52 (see FIGS. 3 and 6), and the lock nut 10 is pressed down causing the crimp radii 18 to crimp the respective flats 16 of the lock nut 10 (see FIGS. 4 and 7). The device 40 is configured to provide generally broad contact points with a lock nut during crimping, and displace metal about the axial center of the lock nut, using a contour compatible with the thread pitch and radius of the threaded bolt (on which the lock nut is meant to be threaded), thereby reducing the amount of on torque required to install the lock nut while meeting off torque specifications. Preferably, the device is configured to minimize distortion of the flats and corners of the lock nut thereby allowing proper subsequent socket tool engagement.

While embodiments of the present invention are shown and described, it is envisioned that those skilled in the art may devise various modifications of the present invention without departing from the spirit and scope of the disclosure.

What is claimed is:

1. A crimped lock nut comprising a plurality of sides and a central, threaded bore, wherein at least one of the plurality of sides has a crimped portion which defines first, second and third crimp surfaces, the third crimp surface curving from the first crimp surface to the second crimp surface, each of said first and second crimp surfaces decreasing in size to a point from said at least one side toward the threaded bore such that said first and second crimp surfaces are generally formed in a shape of a triangle, said third crimp surface being concave in that the third crimp surface curves outwardly from said first and second crimp surfaces, away from the threaded bore and has a radius which is consistent with a radius of the threaded bore in the lock nut.

2. A crimped lock nut as recited in claim 1, wherein the central, threaded bore is configured such that the crimped lock nut is threadably engageable with a threaded member, wherein the crimp radius is consistent with a radius of the threaded member with which the crimped lock nut is engageable.

3. A crimped lock nut as recited in claim 1, wherein the crimped portion is provided at a top of the at least one side of the lock nut.

4. A crimped lock nut as recited in claim 1, wherein the crimped lock nut does not include any nylon inserts.

5. A crimped lock nut as recited in claim 1, wherein the crimped lock nut has six sides and three of the six sides have crimped portions.

6. A lock nut comprising:
a top wall;
a bottom wall;
a plurality of vertical sides which extend from proximate said bottom wall to said top wall; and
a central, threaded bore which extends through said lock nut from said bottom wall to said top wall,
wherein at least one of said vertical sides has a crimped portion at a top thereof which defines first, second and third crimp surfaces, said third crimp surface being defined between said first and second crimp surfaces, said third crimp surface is concave such that said third crimp surface curves outwardly from said first and second crimp surfaces and away from said threaded bore, said third crimp surface has a radius which is consistent with a radius of said threaded bore, each of said first and second crimp surfaces decreasing in size to a point from said at least one vertical side toward said threaded bore and to said top wall such that said first and second crimp surfaces are each generally formed in a shape of a triangle.

7. A lock nut as recited in claim 6, wherein at least a portion of said third crimp surface is planar with said at least one vertical side.

8. A lock nut as recited in claim 6, wherein said first, second and third crimp surfaces are each directly connected to said at least one vertical side such that a ledge is not formed between said at least one vertical side and said first, second and third crimp surfaces.

9. A lock nut as recited in claim 6, wherein the lock nut does not include any nylon inserts.

10. A lock nut as recited in claim 6, wherein the lock nut has six vertical sides and three of the six vertical sides have crimped portions.

11. A crimped lock nut as recited in claim 1, wherein at least a portion of said third crimped surface is planar with said at least one side.

12. A crimped lock nut as recited in claim 1, wherein said first, second and third crimp surfaces are each directly connected to said at least one side such that a ledge portion is not formed between said at least one side and said first, second and third crimp surfaces.

13. A crimped lock nut comprising a plurality of sides and a central, threaded bore, wherein at least one of the plurality of sides has a crimped portion which defines first, second and third crimp surfaces, the third crimp surface curving from the first crimp surface to the second crimp surface, said third crimp surface being concave in that the third crimp surface curves outwardly from said first and second crimp surfaces, away from the threaded bore and has a radius which is consistent with a radius of the threaded bore in the lock nut, wherein at least a portion of said third crimp surface is planar with said at least one side.

\* \* \* \* \*